June 15, 1943.  R. R. KILIAN  2,322,143
CAGE CONSTRUCTION FOR ROLLER BEARINGS
Filed Nov. 26, 1942
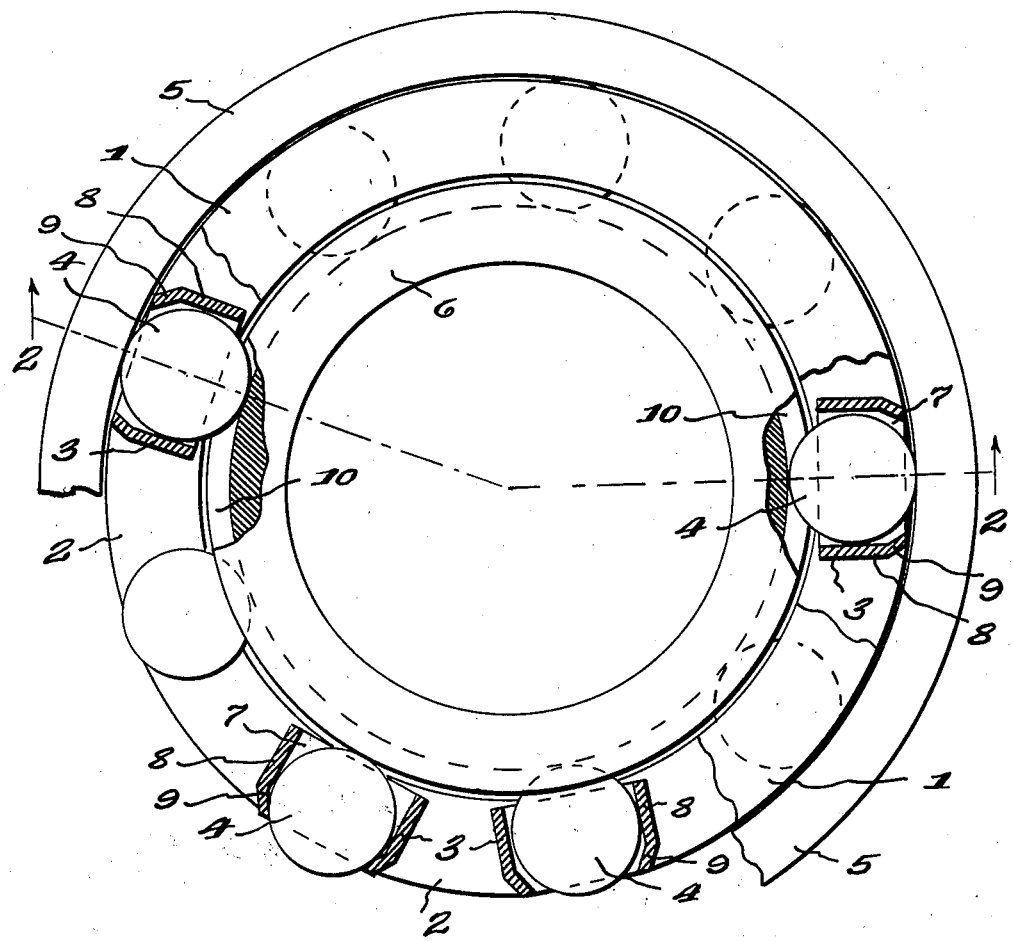
Fig-1-
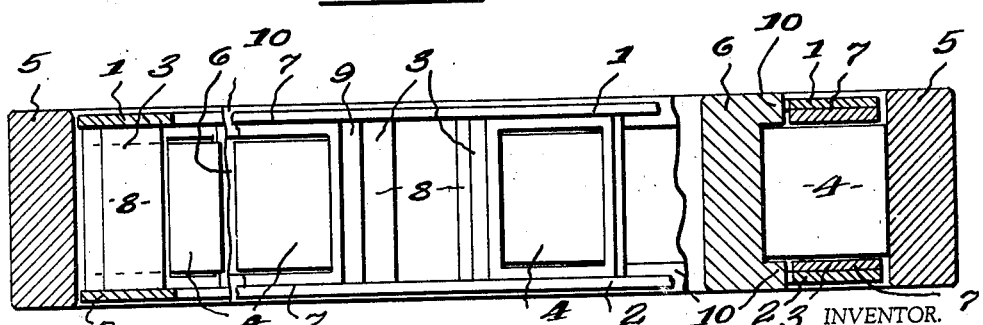
Fig-2-
INVENTOR.
Rudolph R. Kilian
BY Bodell & Thompson
ATTORNEYS.

Patented June 15, 1943

2,322,143

UNITED STATES PATENT OFFICE 2,322,143

CAGE CONSTRUCTION FOR ROLLER BEARINGS

Rudolph R. Kilian, Baldwinsville, N. Y., assignor to Rollway Bearing Company, Inc., Syracuse, N. Y., a corporation of New York Application November 26, 1942, Serial No. 467,015

2 Claims. (Cl. 308—217)

This invention relates to antifriction or roller bearings, and particularly to a cage. It has for its object a cage construction by which the rollers are readily assembled in the cage and in the raceways, and which is particularly simple and economical in construction. It further has for its object a cage consisting of boxes or boxlike frames mounted between annular heads and open at their inner and outer radial edges and having diametrically opposite sides lying flatwise on the opposing faces of the heads and secured thereto, and their other sides, which extend transversely between the former sides, formed with inwardly deflected lips or flanges for holding the rollers from undue radial displacement in one direction.

The invention consists in the novel features and in the combinations and constructions hereinafter set forth and claimed.

In describing this invention, reference is had to the accompanying drawing in which like characters designate corresponding parts in all the views.

Figure 1 is an elevation, partly broken away, of a roller bearing embodying this invention.

Figure 2 is a sectional view approximately on the line of 2—2, Figure 1, partly broken away and parts being removed.

1 and 2 designate opposing annular heads of the cage. 3 designates the boxes or boxlike frames between the heads; 4 the rollers in the boxes or frames; and 5 and 6 the outer and inner raceways. The boxes or frames are so formed up from sheet metal blank into rectangular form, are open at their top and bottom, and are arranged with two diametrically opposite sides or ends, as 7, lying flatwise on the opposing faces of the heads 1, 2 and secured thereto, and with their other sides at 8, which extend transversely between the heads 1, 2 provided with inwardly deflected lips or flanges 9 along like edges thereof for coacting with the rollers and holding them from undue radial displacement in one direction.

One of the raceways is provided with a groove for receiving the rollers, and in the bearing here illustrated, the inner raceway is provided with the peripheral flanges 10 which coact with the ends of the rollers. In bearings where the inner raceway are so formed, the lips or flanges 9 are provided at the outer edges, in a radial direction, of the sides 8 of the boxes to prevent outward radial displacement of the rollers. The lips or flanges 9 are so located in a radial direction that the rollers may be placed in the boxes and move outwardly against the flanges or lips 9 far enough to permit the inner raceway to be placed in position within the annular series of rollers and the rollers then to be displaced radially inward so that they run on the inner raceway and permit the sleeving on of the other raceway 5.

The frames are formed up of sheet metal from a blank into boxlike form and the bottoms of the box removed, leaving the flanges 9. These boxes or frames may be made up and kept in stock for the particular size rollers and assembled with, and permanently secured to the heads 1, as by welding. Thus, owing to these boxes, which act as spacers or locaters for the rollers, obviously, the frames of various sizes for any sizes of rollers may be readily fabricated from stock parts.

What I claim is:

1. A cage for roller bearings comprising flat opposing annular heads and formed up rectangular boxlike frames, between the heads for receiving the rollers, the frames having opposite sides lying flatwise on the inner sides of the heads and integrally secured thereto, and like margins of other diametrically opposite sides which extend between the heads from the former sides having inturned lips at like edges thereof for holding the rollers from radial displacement in one direction.

2. A cage for roller bearings, comprising opposing flat annular heads and formed up rectangular boxlike frames between the heads, the frames having opposing sides lying flatwise on the inner sides of the heads and secured thereto and like margins of the diametrically opposite sides which extend between the heads from the former sides having lips at like edges, the frames spacing and holding the rollers from circumferential displacement and the lips holding the rollers from radial displacement in one direction.

RUDOLPH R. KILIAN.